July 22, 1930.  G. A. CHAUSTOWICH  1,771,075
DISPENSING MACHINE FOR PLASTIC SUBSTANCES
Filed Oct. 3, 1927   2 Sheets-Sheet 1
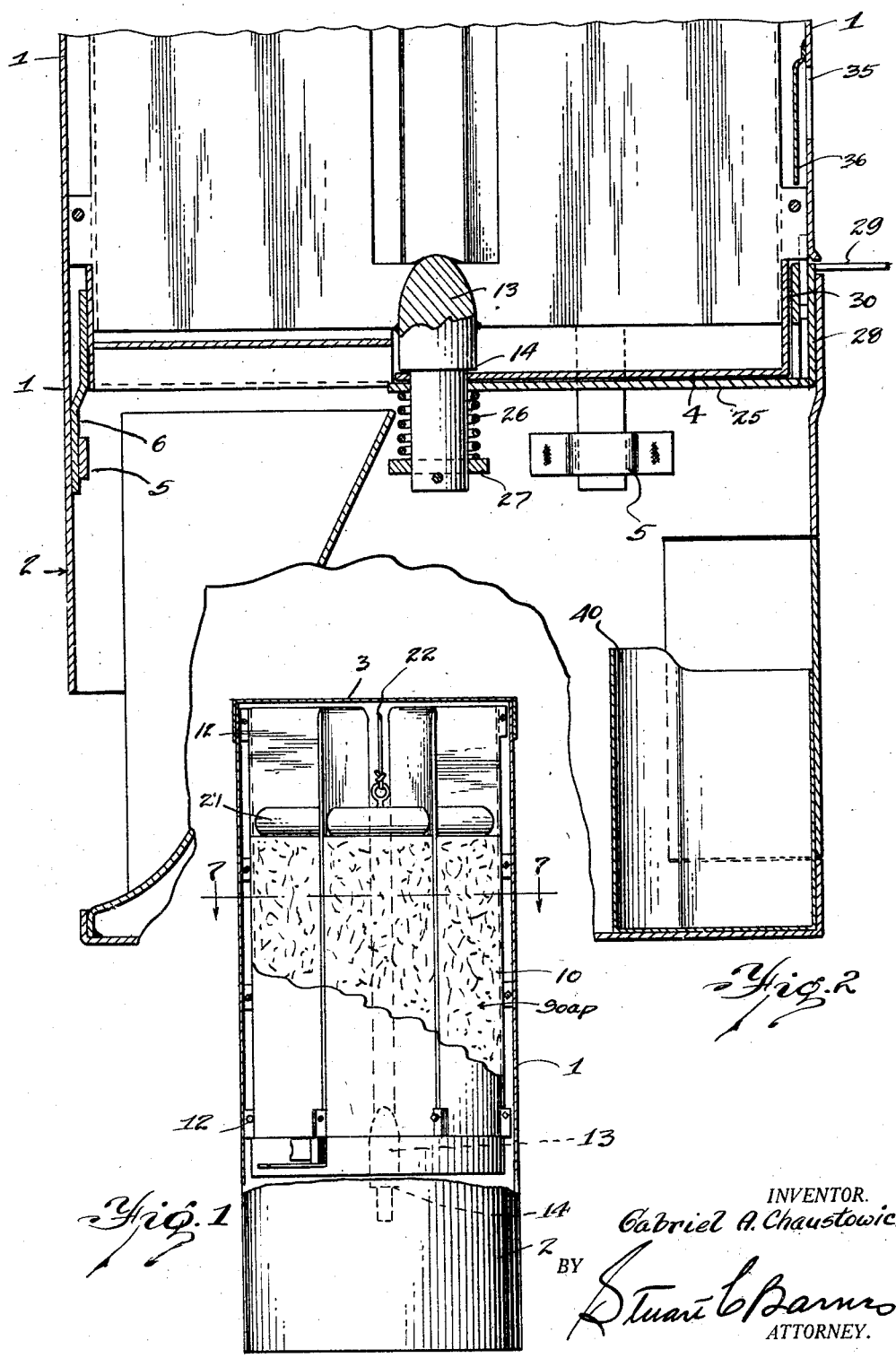

July 22, 1930. G. A. CHAUSTOWICH 1,771,075
DISPENSING MACHINE FOR PLASTIC SUBSTANCES
Filed Oct. 3, 1927 2 Sheets-Sheet 2
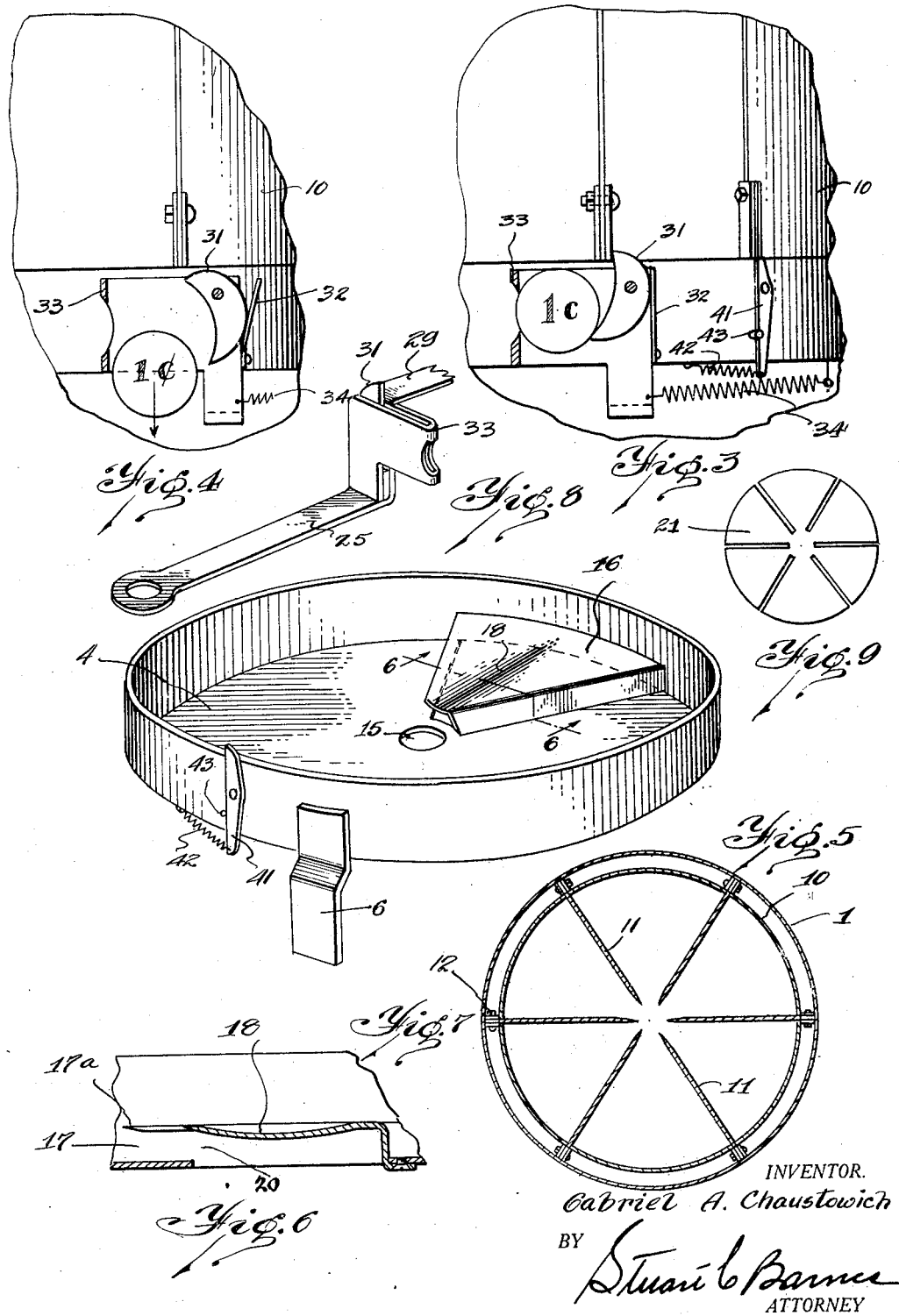

Patented July 22, 1930

1,771,075

UNITED STATES PATENT OFFICE

GABRIEL A. CHAUSTOWICH, OF DETROIT, MICHIGAN

DISPENSING MACHINE FOR PLASTIC SUBSTANCES

Application filed October 3, 1927. Serial No. 223,641.

The invention herein has to do with a dispensing machine for plastic substances, and also with coin control mechanism for the machine.

The device is applicable for dispensing substances such as soap of a plastic or semi-plastic nature, or ice cream; but for the purpose of convenience the machine will be described with particular reference to the dispensing of soap.

In the accompanying drawings:

Fig. 1 is a view of a machine with the outer container cut away, showing a portion of the inner container in plan, and with a portion of the inner container cut away, showing the structural features of the inside of the machine.

Fig. 2 is an enlarged detail view showing the association between the upper and lower parts of the device.

Fig. 3 is a plan view of certain of the mechanism of the coin control apparatus.

Fig. 4 is a view similar to Fig. 3, showing how the coin control actuates in one of its operating movements.

Fig. 5 is a perspective view of the bottom of the container which holds the plastic soap.

Fig. 6 is a sectional view taken on line 6—6 of Fig. 5.

Fig. 7 is a section taken on line 7—7 of Fig. 1.

Fig. 8 is a detailed view of one of the coin-controlled members.

Fig. 9 is a plan view of the weight.

The machine is constituted by an exterior shell 1 which is supported by a bottom portion 2, the exterior shell having a removable cover 3 which may be provided with a suitable lock, if desired. A partition member 4 (Fig. 5) divides the upper and lower members 1 and 2, and preferably it fits within the lower portion 2. The lower portion may be provided with a loop 5 for receiving a projection 6 on the member 4, so that the partition is fixed with this bottom portion against movement.

Within the exterior shell 1 is an interior container member 10. This container is divided from top to bottom into segments by blades 11 which are secured to the container 10, as at 12. This may be done by providing flanged slots at the top and bottom of the container, with the blades provided with projections going through the slots, and small bolts placed therethrough. The blades are fixed to a central spindle-like member 13, shouldered as at 14, and having a reduced end which extends through an opening 15 in the bottom or partition 4. Thus, the interior container with the blades is rotatable with respect to the rest of the machine by the spindle 13 being rotatably mounted on the bottom 4.

This bottom 4 is provided with a raised portion 16 which is open at one side, as at 17 and having a cutting edge 17$^a$. The shouldered spindle positions the rotatable container a distance above the main part of the bottom so that the blades just pass by the raised portion 16. This raised portion is formed with a downwardly dipped wall, as shown at 18, for a purpose which will be presently brought out.

A body of plastic soap, cylindrical in form, is to be placed within the interior container. This is done by removing the cover 3 and forcing the body in the container. While this is done the blades 11 sever the block of soap into six segments. The soap is pushed down against the bottom, and upon rotation of the interior container the blades cause similar rotation of the body of soap. As this is done, a slice of soap is cut off of one of the segments by the wall 16, and the lower part of the machine is provided with an opening 20 positioned just below the portion 16 of the wall, so that this slice of soap drops down into this opening, and can be obtained by an operator.

Viewing Fig. 6, it will be noted that the slice of soap moves in under the wall 16. There is a liability of this slice of soap sticking to the under-side of the portion of the wall 16 and not dropping out of the machine through the opening 20. To prevent this, however, this wall 16 is curved downwardly, as above described, so that the slice of soap is caused to ride over the inverted crest of this curve and be substantially freed from the wall so that it will not stick thereto.

For the purpose of assuring that the soap is held down against the bottom so that slices thereof will be properly dispensed, a weight 21 is placed within the container. This weight is made up of segments divided by slots, so that the segments fit down between the blades. A suitable flexible member, such as a wire 22, may be connected to the weight so that the same may be withdrawn when it is near the bottom of the container.

Thus, it will be noted that as the container is given a rotational movement equal to the segment, a slice of soap is dispensed from one of the segments. In the present instance the body of soap is divided into six segments, and the raised wall portion 16 in the bottom corresponds to the size of these segments. It is within the invention, however, to divide the soap into a smaller or greater number of segments, as desired.

For the purpose of controlling the operation of the machine, a simplified coin control is provided. This coin control takes the form of a lever 25 (Fig. 8) pivotally mounted to the lower end of the spindle 13 (Fig. 2), and a suitable spring 26 and washer 27 may be utilized to position the lever. This lever is bent as at 28 and has an operating part 29 projecting out through a slot in the exterior wall 1. The vertical part of this lever at 28 is preferably bifurcated, consisting of portion 28 and portion 30. Pivotally mounted between these bifurcated parts is an actuating member 31 which may advantageously be of crescent shape, and this member is acted upon by a leaf spring 32. The bifurcated parts 28 and 30 are connected by a wall 33 positioned in advance to the crescent member 31.

This lever is movable a distance equal to one of the segments, which movement is limited by the size of the slot in the exterior container, and it is held in position ready to be operated, at one end of the slot, by a suitable spring 34. The exterior container is provided with an opening 35 for receiving a coin, and the same drops down through a channel 36 until it is engaged between the lower end of the crescent 31 and the wall 33. The distance between the lower end of the crescent and the wall is not sufficient to permit the coin to pass through.

The machine is now ready to be operated, and it will be noted that the upper end of the crescent engages one of the projections on the rotatable container, which projection is formed by the connection between the container and the blades therein. This is an advantageous construction, although projections on the container may be provided in any other manner. Viewing Fig. 2, the lever is now moved from right to left, and the crescent and coin are locked in the position shown, and advance the container.

After the container has been moved as far as it will go, the lever may be released, whereupon it is returned to its original position by the action of the spring 34. At the end of this return movement another projection has arrived, and the crescent engages this projection with a camming action, as shown in Fig. 4, and it is caused to swing on its pivot as it moves under this projection, and drops the coin. A suitable container 40, into which the coin drops, may be provided in the base 2, and access to this container may be had by a suitable opening provided with a lock.

As the crescent passes under the projection on its return movement, it again assumes the position shown in Fig. 3, the leaf spring 32 acting on the crescent to do this. In order to hold the container in position after it has been given a movement, a dog 41 may be pivoted to the fixed bottom and acted upon by the spring 42, and held normally upright by the spring pulling the dog against the stop 43. This dog is positioned so as to engage one of the projections on the rotatable container, and the projections move over the dog with a camming action. After the projection has moved thereover, backward movement is prevented. Thus, backward movement of the container is prevented. Should an attempt be made to operate the machine without the insertion of a coin, the crescent will turn on its pivot as the lever is moved, and the rotatable container will not be actuated.

It will be seen that the entire machine is of a simplified construction, wherein the construction guards against imperfect operation. In other words, actuation of the machine assures the dispensing of a portion of the plastic material, and this plastic material, after once separated from the mass, will not stick to any of the parts into which it comes in contact. Moreover, the coin control mechanism is one which has a positive action, but which is of a construction to permit manufacture at a minimum cost. Moreover, the pawl arrangement positions the rotatable container, and aids in assuring that the coin control lever and its pivoted crescent are properly associated with the rotatable container before actuation. As before mentioned, the container can be divided into a smaller number or a greater number of segments. This may be determined by the size of the entire machine and the quantity of material which it is desirable to dispense.

Claims:

1. A dispensing device for plastic substances, comprising a container for holding a body of plastic substance, means within the container for dividing the body into parts, including blades which extend substantially the length of the container to maintain the parts divided, severing means at one end of the container, and means for setting up relative movement between the body of plastic substance and severing means with step by step movement in which each step corresponds to the size of the divided parts, whereby a portion of the substance is cut from a divided part of the substance in each movement.

2. A dispensing device for plastic substances, comprising a container for receiving a body of plastic substance, means in the container for dividing the same into a plurality of compartments, said means being in the form of blades, whereby a body of substance placed within the container is severed into parts by the blades, severing means at one end of the container, and means for rotating the container with step by step movement corresponding to the size of the divided parts of the substance whereby the severing means cuts off portions of the substance from the divided parts thereof.

3. A dispensing device for plastic substances, comprising a cylindrical container, a plurality of radially extending blade-like partitions within the container which are adapted to divide a body of plastic substance when the same is placed within the container, a fixed bottom for the container, severing means on this fixed bottom, and means for rotating the container with movements which correspond to the size of the divided parts of the substance whereby the severing means severs portions of the substance from these parts.

4. A dispensing device for plastic substances, comprising a cylindrical container, a plurality of radially extending blade-like partitions within the container which are adapted to divide a body of plastic substance when the same is placed within the container, a fixed bottom for the container, severing means on this fixed bottom, means for rotating the container with movements which correspond to the size of the divided parts of the substance whereby the severing means severs portions of the substance from these parts, and a weight provided with radially extending slots through which the blades pass for resting on top of the body of plastic substance.

5. A dispensing device for plastic substances, comprising a cylindrical container for the substance, a bottom for the container, said bottom having a raised portion of segment forms, one edge of which forms a cutter, means for causing relative rotative movement between the container and the bottom whereby slices of the substance are cut from the bottom by the said cutter, said raised portion being curved downwardly in cross section to prevent a severed portion of the plastic substance from sticking thereto.

6. A dispensing device for plastic substances, comprising a rotatable container for containing the body of the substance, said container being cylindrical and divided into segments by blade-like partitions, a fixed bottom for the container upon which the substance rests, said bottom having a raised portion of a shape which corresponds to the segments of the divided substance and said raised portion being substantially parallel with the remaining part of the bottom, means for rotating the container by step by step movement whereby the raised portion severs off a slice of substance from a segment at each movement.

7. A dispensing device for plastic substances, comprising a rotatable container for containing a body of the substance, said container being cylindrical and divided into segments by a blade-like partition, a fixed bottom for the continer upon which the substance rests, said bottom having a raised portion of a shape which corresponds to the segments of the divided substance, said raised portion being substantially parallel with the remaining part of the bottom, means for rotating the container by step by step movement whereby the raised portion severs off a slice of substance from a segment at each movement, said raised section having a downwardly curved formation.

8. A dispensing device for plastic substances, comprising a container for holding the plastic substance to be dispensed, a plurality of radially extending blades within the container, said blades extending substantially the entire length of the container and dividing the same segmentally whereby to hold the plastic substance in divided segments, severing means at one end of the container and means for setting up relative movement between the plastic substance and the severing means with step-by-step movement to sever portions of the substance from the segmental divisions thereof, said blades serving to retain divisions of plastic substance separated to prevent the same from running together.

In testimony whereof I affix my signature.

GABRIEL A. CHAUSTOWICH.